ABSTRACT OF THE DISCLOSURE

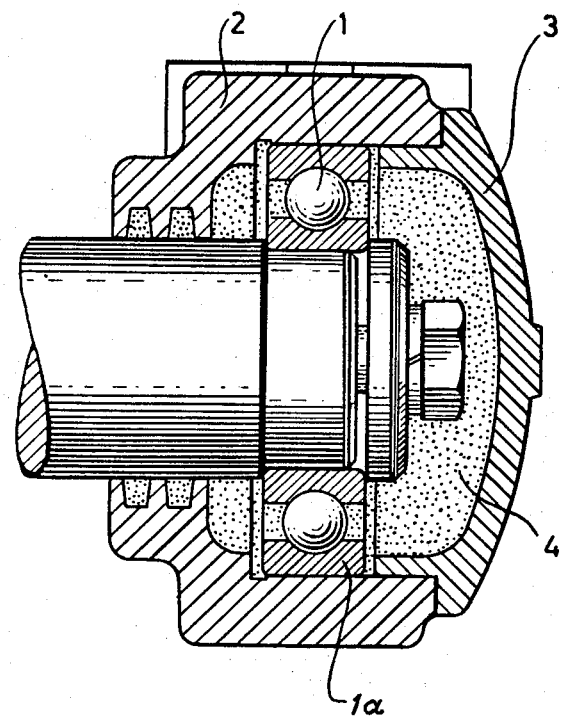
Curt Bues
Hans-Albert Granzin
Gerhard Pfleiderer
Heinrich Anger
INVENTORS 3,414,084
PROCESS OF LUBRICATING AND SEALING
ROLLER BEARINGS AND ARTICLE MADE
FROM THE PROCESS
Curt Bues, Gollenshausen Post Gstadt, Hans-Albert Granzin, Sprendlingen, Gerhard Pfleiderer, Kelkheim, Taunus, and Heinrich Anger, Frankfurt am Main, Germany, assignors to Farbwerke Hoechst Aktiengesellschaft vormals Meister Lucius & Bruning, Frankfurt am Main, Germany, a corporation of Germany
Filed May 4, 1965, Ser. No. 453,193
Claims priority, application Germany, May 11, 1964,
K 52,920
5 Claims. (Cl. 184—1)

Lubrication and sealing of roller bearings by introducing into the interior thereof a polytetrafluoroethylene powder which will coat the bearing elements and sealing cushions and fill in the voids upon expansion with use, and roller bearings so lubricated and sealed.

---

The present invention relates to a process of lubricating and sealing roller bearings (a term intended generically to include bearings having antifriction elements in rolling contact with relatively moving surfaces, such as roller bearings, ball bearings and the like) with the aid of polytetrafluoroethylene.

It is known that for the purpose of lubrication roller bearings are filled with oil or grease. When, however, roller bearings which have been lubricated with oil or grease are operated in an atmosphere of high humidity or in steam or are contaminated with salt solutions or foreign substances, this kind of lubrication is not very satisfactory because the aforesaid lubricants are not stable at temperatures above 120° C. or, especially when oils are used, they are washed out after a short period of time by water or steam. Moreover, under the conditions in practice, rust is rapidly formed in the roller bearings so that with the use of conventional lubricants the roller bearings have but a short life.

Still further, it is known to provide elements of roller bearings, for example the surfaces of the rolling bodies and the surfaces of the ring bearings, with firmly adhering coatings of polytetrafluoroethylene. Owing to the excellent lubricating properties of polytetrafluoroethylene, roller bearings of this type need not be lubricated with the usual lubricants. However, the production of the aforesaid roller bearings is very expensive and complicated, since the elements to be coated must be produced with smaller dimensions and the layers of polytetrafluoroethylene, applied by a very complicated method, must have a definite thickness in order to guarantee the dimensional accuracy of the elements. In addition thereto, roller bearings of this type have the drawback that they cannot be loaded as heavily as roller bearings made of steel.

It is likewise known to use packing rings of polytetrafluoroethylene for roller bearings and housings of roller bearings. The said packing rings do not age and are fast to oil so that a leakage of oil or grease and the penetration of water, chemicals, dust or dirt into the roller bearings are effectively avoided. However, in comparison with the commonly used rubber rings, the packing rings made of polytetrafluoroethylene are absolutely rigid so that, with misalignments and deflections of the shafts, they do not rest evenly with their circumference on the opposed sealing surfaces and a complete sealing cannot be brought about.

The present invention provides a process of lubricating and sealing roller bearings which does not possess the aforesaid drawbacks and which is characterized in that polytetrafluoroethylene in the form of a powder is introduced as dry lubricant into the roller bearings in an amount corresponding to the size of the housing. The said polytetrafluoroethylene forms a powdery covering on the elements of the roller bearings and on previous points of the housing and cushions in the gaps between the sealing elements.

By the centrifugal force and the air twirl in the rotating roller bearings the introduced polytetrafluoroethylene powder is whirled around and finely distributed. The polytetrafluoroethylene powder deposits on all elements of the roller bearing. Owing to the very low coefficient of friction and the excellent thermostability of up to about 300° C. of the polytetrafluoroethylene powder, a very good lubricating effect is obtained. Simultaneously, the elements of the roller bearings which are covered with the polymer dust are protected against corrosion of any kind because the polytetrafluoroethylene powder does not absorb water and is resistant towards almost all chemicals, even at high temperatures of up to 300° C.

The polytetrafluoroethylene powder which is used in simple manner as dry lubricant has excellent sliding properties and in addition thereto it brings about a sealing of the roller bearings. Because of the whirling of the powder by the rotating roller bearings, the roller bearing elements are not only provided with a lubricating coating, but cushions are formed where the housings are not tight and in the gaps between the sealing elements of the roller bearings. These cushions, which have the shape of more or less solid heaps or rings of polytetrafluoroethylene powder, prevent water, corrosive vapors, salts and foreign substances from penetrating into the roller bearings. The sealing properties of the polytetrafluoroethylene powder are effectively promoted by its expansion value, on heating, to 7 to 10 times the original volume, which brings about an increase in density, and by its hydrophobic property.

The invention is further illustrated in the accompanying drawing wherein the sole figure is an elevation, in cross section, through a ball bearing typical of the invention, showing ball bearing elements 1 in a race 1a within a housing 2 provided with a cover 3 and filled with polytetrafluoroethylene powder 4.

According to a further embodiment of the invention, the polytetrafluoroethylene can be admixed with other known dry lubricants, for example molybdenum disulfide or graphite powder. Thus, the lubricating properties are modified. The surfaces of the elements of the roller bearings may be roughened by known mechanical or chemical means so that larger amounts of polytetrafluoroethylene deposit and the thickness of the coatings is enlarged. The elements of the roller bearings may be provided with metallic or non-metallic coatings in known manner in order to modify the sliding properties and to bring about a better protection against corrosion. Suitable coatings are, for example, coatings of nickel, phosphates or oxides.

We claim:
1. A process of lubricating and sealing roller bearings, which comprises substantially filling the roller bearing housing with powdery polytetrafluoroethylene as dry lubricant in an amount corresponding to the size of the roller bearing, thereafter operating said bearing to cause said polytetrafluoroethylene powder to form a dusty covering on the elements of the roller bearing and sealing cushions on pervious points of the housing and in gaps between the sealing elements mounted in said housing.

2. The process of claim 1, wherein the powdery polytetrafluoroethylene is admixed with molybdenum disulfide.

3. The process of claim 1, wherein the powdery polytetrafluoroethylene is admixed with graphite powder.

4. The process of claim 1, wherein the surfaces of the roller bearing elements are first roughened.

5. Roller bearing having a housing completely filled with polytetrafluoroethylene powder for lubricating and sealing said bearing.

References Cited

UNITED STATES PATENTS 3,059,318   10/1962   Herbert et al.

FOREIGN PATENTS 1,079,901   4/1960   Germany.
707,066   4/1954   Great Britain.
833,591   4/1960   Great Britain.

LAVERNE D. GEIGER, *Primary Examiner.*

E. J. EARLS, *Assistant Examiner.*